Nov. 2, 1948. M. C. COLE 2,452,904
BROODER
Filed Feb. 16, 1945
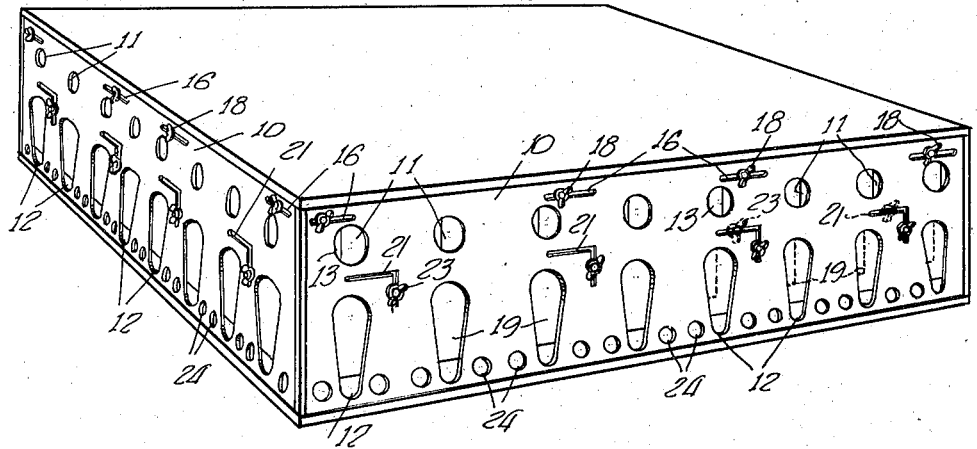
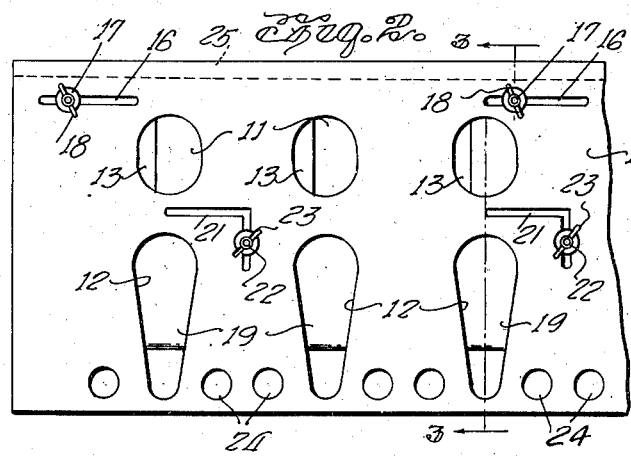
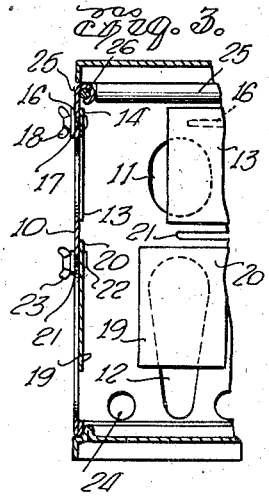
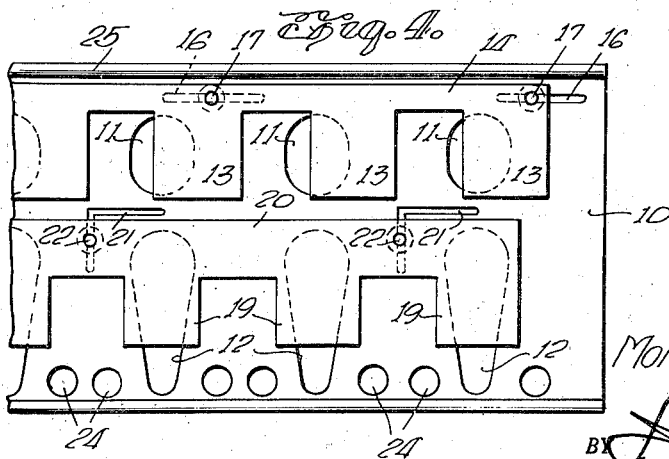
MONROE C. COLE
INVENTOR.

Patented Nov. 2, 1948

2,452,904

UNITED STATES PATENT OFFICE 2,452,904

BROODER

Monroe C. Cole, Dallas, Tex.

Application February 16, 1945, Serial No. 578,305

7 Claims. (Cl. 119—31)

This invention relates to poultry brooders and it has particular reference to a brooder, wherein chicks are raised to broilers, without structural variation thereof.

The principal object of the invention is to provide a brooder, especially designed for decking, whose walls have openings spaced along their upper portions for ventilation and similar openings below for feeding and watering, but provision is made, by virtue of the invention, to so regulate the size of the openings, especially the latter, to accommodate the birds as they increase in size to the broiler stage. An advantage of the invention over anything heretofore known for the purpose, lies in the fact that adjustments in the size of the feeding and watering openings can be made by simple facilities occupying but little, if any, additional part of the limited space of a brooder and each adjustment requires but a few movements to accomplish.

Another object of the invention resides in means to effect a similar adjustment of the size of the light and ventilating openings. Regulation of drafts and especially light is most important in a brooder to keep excitement of the birds at a minimum and to reduce cannibalism. This is effected by the invention easily and quickly and no additional space is required for the purpose.

With the foregoing objects as paramount, the invention has further reference to certain features of accomplishment which will become apparent as the description proceeds, taken in connection with the accompanying drawings wherein:

Figure 1 is a perspective view of a typical deck construction, showing the invention.

Figure 2 is a fragmentary elevational view of one wall of the brooder, showing the ventilating and feeding openings partly open.

Figure 3 is a view in vertical section taken on line 3—3 on Figure 2, and

Figure 4 is a fragmentary elevational view of the reverse side of the wall shown in Figure 2.

Continuing with a more detailed description of the drawing, reference is primarily made to Figure 1 wherein is shown a brooder, not unlike conventional deck brooders insofar as length and breadth are concerned but, of course, is of corresponding height to any deck brooder designed to accommodate poultry from chick to broiler stage. However, the walls 10 of the improved brooder are each provided with aligned openings 11 near their tops to admit light and air and below these openings are vertically elongated or inverted pear shaped openings 12 for feeding and watering.

In order to regulate the amount of light and air entering through openings 11, a plurality of closure plates 13, equal in number to that of the openings 11, are formed from a flat strip of metal by stamping or otherwise, to define also a bar 14 (Fig. 4), overlying the openings 11, of a length less than the length of the wall by the width, substantially, of one of the openings 11, so that the plates 13 may be moved to fully open or fully closed position with respect to the said openings.

The walls of the brooder are provided with horizontal, axially aligned slots 16 which receive threaded studs 17 affixed to and extending outwardly from the bar 14. Wing nuts 18 are threaded onto the studs 17 and by simply loosening these nuts and moving them horizontally, the bar 14 and consequently the plates 13 are adjusted with respect to the openings 11 to increase or decrease the quantity of air or light entering through the openings. It is clearly apparent that this adjustment is accomplished without exciting the poultry and since the plates 13 lie flush against the inner surface of the wall 10, there are no projections on which the birds may become injured and the space occupied by the closure is negligible.

The size of the feeding and watering openings 12 is regulated by an arrangement similar to that above described but it will become apparent presently that because of limited space, both horizontal and vertical movement of the closures are provided.

The closures consist of plates 19 integral with and depending from a flat bar 20 (Fig. 4) which extends lengthwise of the wall, between the openings 11 and 12.

Slots 21 are formed in the wall 10 and are of substantially L-shape, one leg extending longitudinally while the other is vertically disposed, parallel with the major axis of the elongated openings 12. Threaded studs 22 are affixed to the bar 20 and extend through the slots 21 to receive wing nuts 23, by which the bar is not only held in adjusted positions but also are employed for shifting the bar longitudinally and vertically to correspondingly move the plates 19 with respect to the openings 12 whose size they regulate.

In Figure 1, certain of the feeding openings 12 are shown with the closure plates 19 in dotted lines in a position to accommodate chicks, while the solid lines show the plates disposed as they would be if half grown broilers were housed in the brooder. This showing is for illustration only because the closures would seldom if ever be constructed to operate in this manner. It is intended to show, in this manner, the position of the closures when small chicks are housed, as well as the position when the chicks have grown to near broiler size. After maturity, the studs 22 are moved to the end of the horizontal leg of slot 21 to dispose the closure plates 19 over the spaces between the openings 12, in which position of the plates, the openings will be full size. The small openings 24 along the bottom of the walls 10 may likewise serve as feeding and ventilating openings but these are present in conventional brooders and no provision is herein made to vary the size of the openings.

It is clearly apparent from the foregoing that provision may be made to hingedly support an entire wall by means of a rolled upper edge 25, mounted on a rod 26 (Fig. 3), or a section thereof to serve as a door.

Manifestly, the construction as shown and described is capable of some modification and modifications such as may be construed to fall within the scope and meaning of the appended claims are also considered to be within the spirit and intent of the invention.

What is claimed is:

1. In a brooder, a wall having a plurality of horizontally spaced, vertically elongated openings therein, closures for each of said openings, suspended from a common mounting, said wall having substantially L-shaped slots at spaced intervals the length thereof, threaded studs on said mounting receivable in said slots, and means mounted on said studs for moving said mounting vertically and horizontally to correspondingly move said plates relative to their respective openings.

2. In a brooder, a wall having vertically elongated openings therein, a plate adjacent each opening, all plates being suspended from a common, horizontally disposed mounting L-shaped slots in said wall, means supporting said mounting through said slots and adjustable therein for moving said mounting vertically and horizontally to correspondingly move said plates with respect to said openings and means for securing said mounting supporting means in adjusted positions.

3. In a brooder, a wall having a plurality of openings therein, and a series of substantially L-shaped slots a closure plate for each opening, a common mounting for said plates and means supporting said mounting through said slots and adjustable therein for horizontally and vertically moving said mounting to correspondingly move said plates to vary the effective size of said openings.

4. In a brooder, a wall having openings and substantially L-shaped slots therein, means attached to one face of said wall to partially cover said openings, and means supporting said first means through said slots, by which to move said first means vertically and horizontally.

5. In a brooder, a wall having openings and L-shaped slots therein means movable both vertically and horizontally to vary the effective area of said openings, and means movable in said slots and supporting said first means and capable of securement in adjusted positions in said slots.

6. In a brooder, a wall having horizontally spaced openings therein, a member lying flush against the inner face of said wall and formed to define a longitudinal bar having relatively spaced plates movable in relation to said opening, said bar having threaded studs slidable in horizontal and vertical legs of substantially L-shaped slots in the wall of said brooder, and means receivable on said studs for securing said bar and said plates in adjusted positions with respect to said openings.

7. In a brooder, a wall having a series of relatively spaced light and ventilating openings along the top thereof and a series of horizontally spaced, vertically elongated openings therebelow, said wall further having inverted L-shaped slots therein, a series of plates suspended from a common, longitudinal mounting disposed over each of said series of openings and means supporting at least one of said mountings in said slots and adjustable for shifting said mounting to cause said plates to cover or partially cover said openings.

MONROE C. COLE.

REFERENCES CITED

The following references are of record in the file of this patent:

UNITED STATES PATENTS

| Number | Name | Date |
|---|---|---|
| 712,339 | Siems | Oct. 28, 1902 |
| 914,001 | Withrow | Mar. 2, 1909 |
| 1,167,385 | Clough | Jan. 11, 1916 |
| 1,831,444 | Gorsuch | Nov. 10, 1931 |
| 1,850,351 | Markey et al. | Mar. 22, 1932 |
| 2,388,157 | Kerr | Oct. 30, 1945 |

FOREIGN PATENTS

| Number | Country | Date |
|---|---|---|
| 2,506 | Great Britain | 1888 |
| 13,571 | Germany | May 9, 1881 |